(12) United States Patent
Ozer et al.

(10) Patent No.: US 7,075,890 B2
(45) Date of Patent: Jul. 11, 2006

(54) SYSTEM AND METHOD TO PROVIDE FAIRNESS AND SERVICE DIFFERENTATION IN AD-HOC NETWORKS

(75) Inventors: Sebnem Z. Ozer, Altamonte Springs, FL (US); Surong Zeng, Altamonte Springs, FL (US); Charles R. Barker, Jr., Orlando, FL (US)

(73) Assignee: MeshNetworks, Inc., Maitland, FL (US)

( * ) Notice: Subject to any disclaimer, the term of this patent is extended or adjusted under 35 U.S.C. 154(b) by 0 days.

(21) Appl. No.: 10/863,076

(22) Filed: Jun. 7, 2004

(65) Prior Publication Data

US 2005/0002364 A1    Jan. 6, 2005

Related U.S. Application Data

(60) Provisional application No. 60/476,168, filed on Jun. 6, 2003.

(51) Int. Cl.
| | |
|---|---|
| *H04L 12/413* | (2006.01) |
| *H04B 7/212* | (2006.01) |
| *H04J 3/14* | (2006.01) |

(52) U.S. Cl. .................. 370/230; 370/235; 370/348; 370/444; 370/447

(58) Field of Classification Search .............. 370/230, 370/230.1, 232, 235–238, 248, 252, 254, 370/313, 315, 328, 329, 349, 356, 389, 390, 370/392, 400, 401, 442–445, 447, 477, 346, 370/348
See application file for complete search history.

(56) References Cited

U.S. PATENT DOCUMENTS

| 4,494,192 A | 1/1985 | Lew et al. |
| 4,617,656 A | 10/1986 | Kobayashi et al. |
| 4,736,371 A | 4/1988 | Tejima et al. |
| 4,742,357 A | 5/1988 | Rackley |

(Continued)

FOREIGN PATENT DOCUMENTS

| CA | 2132180 | 3/1996 |

(Continued)

OTHER PUBLICATIONS

Wong, et al., "Soft Handoffs in CDMA Mobile Systems," Dec. 1997, IEEE Personal Communications.

(Continued)

*Primary Examiner*—Hassan Kizou
*Assistant Examiner*—Gregory Sefcheck
(74) *Attorney, Agent, or Firm*—Randi L. Karpinia; Joseph J. Buczynski (57) ABSTRACT

A system and method for a media access control (MAC) scheduling algorithm having a distributed, self-coordinating approach to provide use fairness and service differentiation in an ad hoc network by using control RTS/CTS messages carrying node status information. A local scheduling algorithm uses the overheard RTS/CTS information with attributes specifying nodes' status to maximize the awareness of the neighborhood status for a multi-channel system where data and ACK messages are transmitted through different data channels. If the system uses a single channel, the corresponding information may be carried by using DATA or ACK messages. The algorithm measures the offered load, carried load, and backlogged load in the neighborhood to adjust the channel access timer to provide use fairness among different nodes, different links, and different streams. The algorithm can further both calculate the priority level based on the node queue status, and calculate the priority level based on the neighbor status, to break the contention tiers and enable the service differentiation.

20 Claims, 2 Drawing Sheets

U.S. PATENT DOCUMENTS

| | | |
|---|---|---|
| 4,747,130 A | 5/1988 | Ho |
| 4,910,521 A | 3/1990 | Mellon |
| 5,034,961 A | 7/1991 | Adams |
| 5,068,916 A | 11/1991 | Harrison et al. |
| 5,231,634 A | 7/1993 | Giles et al. |
| 5,233,604 A | 8/1993 | Ahmadi et al. |
| 5,241,542 A | 8/1993 | Natarajan et al. |
| 5,317,566 A | 5/1994 | Joshi |
| 5,392,450 A | 2/1995 | Nossen |
| 5,412,654 A | 5/1995 | Perkins |
| 5,424,747 A | 6/1995 | Chazelas |
| 5,502,722 A | 3/1996 | Fulghum |
| 5,517,491 A | 5/1996 | Nanni et al. |
| 5,555,425 A | 9/1996 | Zeller et al. |
| 5,555,540 A | 9/1996 | Radke |
| 5,572,528 A | 11/1996 | Shuen |
| 5,615,212 A | 3/1997 | Ruszczyk et al. |
| 5,618,045 A | 4/1997 | Kagan et al. |
| 5,621,732 A | 4/1997 | Osawa |
| 5,623,495 A | 4/1997 | Eng et al. |
| 5,627,976 A | 5/1997 | McFarland et al. |
| 5,631,897 A | 5/1997 | Pacheco et al. |
| 5,644,576 A | 7/1997 | Bauchot et al. |
| 5,652,751 A | 7/1997 | Sharony |
| 5,680,392 A | 10/1997 | Semaan |
| 5,684,794 A | 11/1997 | Lopez et al. |
| 5,687,194 A | 11/1997 | Paneth et al. |
| 5,696,903 A | 12/1997 | Mahany |
| 5,701,294 A | 12/1997 | Ward et al. |
| 5,706,428 A | 1/1998 | Boer et al. |
| 5,717,689 A | 2/1998 | Ayanoglu |
| 5,745,483 A | 4/1998 | Nakagawa et al. |
| 5,774,876 A | 6/1998 | Wooley et al. |
| 5,781,540 A | 7/1998 | Malcolm et al. |
| 5,787,080 A | 7/1998 | Hulyalkar et al. |
| 5,794,154 A | 8/1998 | Bar-On et al. |
| 5,796,732 A | 8/1998 | Mazzola et al. |
| 5,796,741 A | 8/1998 | Saito et al. |
| 5,805,593 A | 9/1998 | Busche |
| 5,805,842 A | 9/1998 | Nagaraj et al. |
| 5,805,977 A | 9/1998 | Hill et al. |
| 5,809,518 A | 9/1998 | Lee |
| 5,822,309 A | 10/1998 | Ayanoglu et al. |
| 5,844,905 A * | 12/1998 | McKay et al. ............... 370/443 |
| 5,845,097 A | 12/1998 | Kang et al. |
| 5,857,084 A | 1/1999 | Klein |
| 5,870,350 A | 2/1999 | Bertin et al. |
| 5,877,724 A | 3/1999 | Davis |
| 5,881,095 A | 3/1999 | Cadd |
| 5,881,372 A | 3/1999 | Kruys |
| 5,886,992 A | 3/1999 | Raatikainen et al. |
| 5,896,561 A | 4/1999 | Schrader et al. |
| 5,903,559 A | 5/1999 | Acharya et al. |
| 5,909,651 A | 6/1999 | Chander et al. |
| 5,936,953 A | 8/1999 | Simmons |
| 5,943,322 A | 8/1999 | Mayer et al. |
| 5,987,011 A | 11/1999 | Toh |
| 5,987,033 A | 11/1999 | Boer et al. |
| 5,991,279 A | 11/1999 | Haugli et al. |
| 6,028,853 A | 2/2000 | Haartsen |
| 6,029,217 A | 2/2000 | Arimilli et al. |
| 6,034,542 A | 3/2000 | Ridgeway |
| 6,044,062 A | 3/2000 | Brownrigg et al. |
| 6,047,330 A | 4/2000 | Stracke, Jr. |
| 6,052,594 A | 4/2000 | Chuang et al. |
| 6,052,752 A | 4/2000 | Kwon |
| 6,064,626 A | 5/2000 | Stevens |
| 6,067,291 A | 5/2000 | Kamerman et al. |
| 6,067,297 A | 5/2000 | Beach |
| 6,078,566 A | 6/2000 | Kikinis |
| 6,104,712 A | 8/2000 | Robert et al. |
| 6,108,738 A | 8/2000 | Chambers et al. |
| 6,115,580 A | 9/2000 | Chuprun et al. |
| 6,122,690 A | 9/2000 | Nannetti et al. |
| 6,130,881 A | 10/2000 | Stiller et al. |
| 6,132,306 A | 10/2000 | Trompower |
| 6,147,975 A | 11/2000 | Bowman-Amuah |
| 6,163,699 A | 12/2000 | Naor et al. |
| 6,178,337 B1 | 1/2001 | Spartz et al. |
| 6,192,053 B1 | 2/2001 | Angelico et al. |
| 6,192,230 B1 | 2/2001 | Van Bokhorst et al. |
| 6,198,728 B1 * | 3/2001 | Hulyalkar et al. ....... 370/310.1 |
| 6,208,870 B1 | 3/2001 | Lorello et al. |
| 6,222,463 B1 | 4/2001 | Rai |
| 6,222,504 B1 | 4/2001 | Oby |
| 6,223,240 B1 | 4/2001 | Odenwald et al. |
| 6,240,294 B1 | 5/2001 | Hamilton et al. |
| 6,246,875 B1 | 6/2001 | Seaholtz et al. |
| 6,249,516 B1 | 6/2001 | Brownrigg et al. |
| 6,275,707 B1 | 8/2001 | Reed et al. |
| 6,285,892 B1 | 9/2001 | Hulyalkar |
| 6,304,556 B1 | 10/2001 | Haas |
| 6,327,300 B1 | 12/2001 | Souissi et al. |
| 6,349,091 B1 | 2/2002 | Li |
| 6,349,210 B1 | 2/2002 | Li |
| 6,359,872 B1 | 3/2002 | Mahany et al. |
| 6,363,062 B1 * | 3/2002 | Aaronson et al. ........... 370/348 |
| 6,366,568 B1 | 4/2002 | Bolgiano et al. |
| 6,404,756 B1 * | 6/2002 | Whitehill et al. ........... 370/338 |
| 6,405,049 B1 | 6/2002 | Herrod et al. |
| 6,556,582 B1 * | 4/2003 | Redi ........................ 370/443 |
| 6,611,521 B1 * | 8/2003 | McKay et al. ............... 370/392 |
| 6,721,325 B1 * | 4/2004 | Duckering et al. ...... 370/395.4 |
| 2001/0053699 A1 | 12/2001 | McCrady et al. |
| 2002/0013856 A1 | 1/2002 | Garcia-Luna-Aceves |
| 2002/0172186 A1 * | 11/2002 | Larsson ...................... 370/349 |
| 2003/0012167 A1 * | 1/2003 | Benveniste ................. 370/338 |
| 2003/0067892 A1 * | 4/2003 | Beyer et al. ................ 370/328 |
| 2004/0057409 A1 * | 3/2004 | Kennedy .................... 370/338 |
| 2004/0100929 A1 * | 5/2004 | Garcia-Luna-Aceves .... 370/338 |
| 2004/0143681 A1 * | 7/2004 | Benveniste ................. 709/249 |
| 2004/0156388 A1 * | 8/2004 | Bush ......................... 370/465 |

FOREIGN PATENT DOCUMENTS

| | | |
|---|---|---|
| EP | 0513841 A2 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Wong et al., "A Pattern Recognition System for Handoff Algorithms," Jul. 2000, IEEE Journal on Selected Areas in Communications, vol. 18, No. 7.

Andras G. Valko, "Cellular IP: A New Approach to Internet Host Mobility," Jan. 1999, ACM Computer Communication Review.

Richard North, Dale Bryan and Dennis Baker, "Wireless Networked Radios: Comparison of Military, Commercial and R&D Protocols," Feb. 28-Mar. 3, 1999, 2nd Annual UCSD Conference on Wireless Communications, San Diego, CA.

Benjamin B. Peterson, Chris Kmiecik, Richard Hartnett, Patrick M. Thompson, Jose Mendoza and Hung Nguyen, "Spread Spectrum Indoor Geolocation," Aug. 1998, Navigation: Journal of the Institute of Navigation, vol. 45, No. 2, Summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols," Oct. 25-30, 1998, Proceedings of the 4th Annual ACM/IEEE International Conference on Mobile Computing and Networking.

C. David Young, "USAP: A Unifying Dynamic Distributed Multichannel TDMA Slot Assignment Protocol".

Chip Elliott and Bob Heile, "Self-Organizing, Self-Healing Wireless Networks," 2000 IEEE.

J.J. Garcia-Luna-Aceves and Asimakis Tzamaloukas, "Reversing the Collision-Avoidance Handshake in Wireless Networks".

J.J. Garcia-Luna-Aceves and Marcelo Spohn, "Transmission-Efficient Routing in Wireless Networks Using Link-State Information".

J.J. Garcia-Luna-Aceves and Ewerton L. Madruga, "The Core-Assisted Mesh Protocol," Aug. 1999, IEEE Journal on Selected Areas in Communications, vol. 17, No. 8.

Ad Kamerman and Guido Aben, "Net Throughput with IEEE 802.11 Wireless LANs".

J. R. McChesney and R.J. Saulitis, "Optimization of an Adaptive Link Control Protocol for Multimedia Packet Radio Networks".

Ram Ramanathan and Regina Rosales-Hain, "Topology Control of Multihop Wireless Networks Using Transmit Power Adjustment".

Ram Ramanathan and Martha E. Steenstrup, "Hierarchically-Organized, Multihop Mobile Wireless Networks for Quality-of-Service Support".

Martha E. Steenstrup, "Dynamic Multipoint Virtual Circuits for Multimedia Traffic in Multihop Mobile Wireless Networks".

Zhenya Tang and J.J. Garcia-Luna-Aceves, "Collision-Avoidance Transmission Scheduling for Ad-Hoc Networks".

George Vardakas and Wendell Kishaba, "QoS Networking With Adaptive Link Control and Tactical Multi-Channel Software Radios".

* cited by examiner

SYSTEM AND METHOD TO PROVIDE FAIRNESS AND SERVICE DIFFERENTATION IN AD-HOC NETWORKS

This application claims benefit under 35 U.S.C. § 119(e) from U.S. Provisional Patent Application Ser. No. 60/476,168, filed on Jun. 6, 2003, the entire content of which is incorporated herein by reference.

BACKGROUND OF THE INVENTION

1. Field of the Invention

The present invention relates to a medium access control (MAC) protocol in a wireless ad hoc network system. Specifically, a communications system and method with a handshaking protocol is used for data exchange in a single or multi-channel, multihop wireless network including a local scheduling algorithm to resolve fairness and service differentiation problems in a fully distributed system.

2. Description of the Related Art

Wireless communications networks, such as mobile wireless telephone networks, have become increasingly prevalent over the past decade. These wireless communications networks are commonly referred to as "cellular networks", because the network infrastructure is arranged to divide the service area into a plurality of regions called "cells". A terrestrial cellular network includes a plurality of interconnected base stations, or base nodes, that are distributed geographically at designated locations throughout the service area. Each base node includes one or more transceivers that are capable of transmitting and receiving electromagnetic signals, such as radio frequency (RF) communications signals, to and from mobile user nodes, such as wireless telephones, located within the coverage area. The communications signals include, for example, voice data that has been modulated according to a desired modulation technique and transmitted as data packets. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format, which enables a single transceiver at the base node to communicate simultaneously with several mobile nodes in its coverage area.

In recent years, a type of mobile communications network known as an "ad-hoc" network has been developed for use by the military. In this type of network, each mobile node is capable of operating as a base station or router for other mobile nodes, thereby eliminating the need for a fixed infrastructure of base stations. Details of an ad-hoc network are set forth in U.S. Pat. No. 5,943,322 to Mayor, the entire content of which is incorporated herein by reference.

More sophisticated ad-hoc networks are also being developed which, in addition to enabling mobile nodes to communicate with each other as in a conventional ad-hoc network, further enable the mobile nodes to access a fixed network and communicate with other mobile nodes, such as those on the public switched telephone network (PSTN), and on other networks, such as the Internet. Details of these advanced types of ad-hoc networks are described in U.S. patent application Ser. No. 09/897,790 entitled "Ad Hoc Peer-to-Peer Mobile Radio Access System Interfaced to the PSTN and Cellular Networks", filed on Jun. 29, 2001, in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel", filed on Mar. 22, 2001, and in U.S. patent application Ser. No. 09/815,164 entitled "Prioritized-Routing for an Ad-Hoc, Peer-to-Peer, Mobile Radio Access System", filed on Mar. 22, 2001, the entire content of each being incorporated herein by reference.

Communication between nodes, however, is often subject to errors due to interference, multipath and fading effects and collisions. Avoidance of many such errors can be achieved using a control-signal handshake between transmitting and receiving nodes. A communication protocol, such as multiple access with collision avoidance (MACA), uses such a handshake technique between nodes consisting of a request-to-send (RTS) control packet sent from a source node to a destination node which in response, replies with a clear-to-send (CTS) control packet. However, a MACAW algorithm typically handles ARQ retransmissions for corrections of such errors by repeating the whole request-to-send/clear-to-send (RTS/CTS) channel access sequence. In addition, MACAW introduced data-sending (DS) messages to form RTS-CTS-DS-DATA-ACK message exchange and a new backoff algorithm. The IEEE 802.11 MAC is a variation of CSMA/CA protocol that implements both carrier sensing and virtual (RTS-CTS exchange) carrier sensing with acknowledgment messages to improve reliability.

Accordingly, a need exists for a medium access control protocol that can detect and schedule communications in a wireless ad hoc network system to avoid such errors described above, and eliminate the complications associated with corrections.

As discussed in U.S. Pat. No. 6,556,582 issued to Redi, the entire content of which is being incorporated herein by reference, a method to avoid multiple access collision in a MACA based wireless network is described. This collision avoidance scheme is proposed for a system with multiple transceivers, i.e. data channel and reservation channel transceivers. Since the transceivers work simultaneously, no reservation channel transmission is missed. NCTS messages are used to inform other nodes that the intended destination node is busy. Accordingly, a need exists to resolve the problems related to having one transceiver and one or multiple data channels, such as missing reservation data. The method described in the Redi Patent includes also using a priority field in RTS messages. However, processing of this information is based on an absolute comparison, i.e. the relative status of the transmissions in the neighborhood is not used and fairness is not studied.

As discussed in U.S. Pat. No. 6,118,788 issued to Kermani et al., the entire content of which is being incorporated herein by reference, a method to provide fairness in MACA based wireless networks is described. The system considered in the Kermani Patent has only one channel where transmission durations are not distributed in RTS-CTS messages but via an end-of-the burst control frame after the transmission. Accordingly a need exists for address and channel monitoring that includes multiple data channel systems where transmission durations are advertised via RTS-CTS messages. The main objective in the Kermani Patent is to solve hidden terminal problems, but not to also resolve the problems related to having one transceiver and multiple data channels, such as missing reservation data. The proposed system in the Kermani Patent is based on the fact that the neighbors will have the full knowledge of the number, or some other information, of possible and logical connections in the neighborhood by distributing this information. For example, it is suggested that the neighbors that hear an advertised window size will adjust theirs accordingly. However if this information is not correct, this may cause every node to decrease their backoff time and increase the collision. Accordingly a need exists for a method and system that uses feedback from transmissions and receiver assistant information to complete the information about the neighborhood and the link. Service differentiation is not studied in the Kermani Patent.

As discussed in U.S. Patent Application Publication No. 20020154653, issued to Benveniste, the entire content of which is being incorporated herein by reference, a method with backoff adaptation to traffic for CSMA networks is described. The system considered is one-hop system with one channel. The method aims to improve IEEE 802.11 type networks in terms of contention delay and service differentiation. The method is mainly based on the estimation of the traffic intensity from the number of failed transmission attempts. However, in multihopping systems, one important cause of channel access delay is that many streams may be aggregated at one relaying node (such as wireless routers that do not have central controlling capabilities as access points in one-hop systems) and the relaying node may be busy. Therefore, although channel and address monitoring decrease the collision probability (hence, decrease the number of failed transmission attempts), the offered traffic intensity may be high. This delay may cause short term unfairness and slow down TCP type traffic, hence change the actual traffic intensity. Accordingly a need exists for a node weight to alleviate this problem.

Furthermore, a need exists to differentiate reservation channel and data channel collisions for a system with multiple channels. Another point is that, unlike the method described in the Benveniste Publication, streams to different next hops may exist at relaying nodes and therefore a backlogged packet due to the next hop busy status or link failure may be scheduled later than a newer packet destined to another next hop. Incomplete neighborhood information is a major problem in multihop, one or multiple channel networks and accordingly, a need exists for a system and method of comparison of local measurements (via unicast messaging) to alleviate these problems.

SUMMARY OF THE INVENTION

An object of the present invention is to provide a system and method of media access control (MAC) which includes a local scheduling algorithm, specifically a two-way scheduling technique, to provide fairness and service differentiation in an ad hoc network by using RTS/CTS control messages carrying node status information.

Another object of the present invention is to provide a local scheduling algorithm which can measure a single node's information using RTS/CTS message information, and assigning a weight factor to the single node based upon the measured information.

Another object of the present invention is to provide a local scheduling algorithm which can measure a single node's neighbor node information using RTS/CTS message information, and assigning a weight factor to each neighbor node of the single node based upon the measured information.

Another object of the present invention is to provide a local scheduling algorithm which can execute at least two scheduling schemes, including a first stateless scheme using only a single node's weight factor, and a second stateful scheme using a single node's weight factor and a neighbor node's weight factor.

Another object of the present invention is to provide a local scheduling algorithm which can execute at least two scheduling schemes to adjust channel access to provide fair use among nodes, different links, and different streams.

These and other objects are substantially achieved by providing a system and method for a MAC algorithm having a distributed, self-coordinating approach to provide use fairness and service differentiation in an ad hoc network by using control RTS/CTS messages carrying node status information. A local scheduling algorithm is provided and uses the overheard RTS/CTS information with attributes specifying nodes' status to maximize the awareness of the neighborhood. The system may consist of a single channel or multiple channels where data and ACK messages are transmitted through different channels. The algorithm measures the offered load, carried load, and backlogged load in the neighborhood to adjust the channel access timer to provide use fairness among different nodes, different links, and different streams. The algorithm can further both calculate the priority level based on the node queue status, and calculate the priority level based on the neighbor status, to break the contention tiers and enable the service differentiation.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

In the embodiment of the present invention described below, a communications system and method are disclosed including a handshaking protocol for data exchange in a single/multi-channel, multihop wireless network. A local scheduling algorithm is provided at one or more nodes to solve channel use fairness and service differentiation problems in a fully distributed system such as network 100 of FIG. 1.

Figure 1:
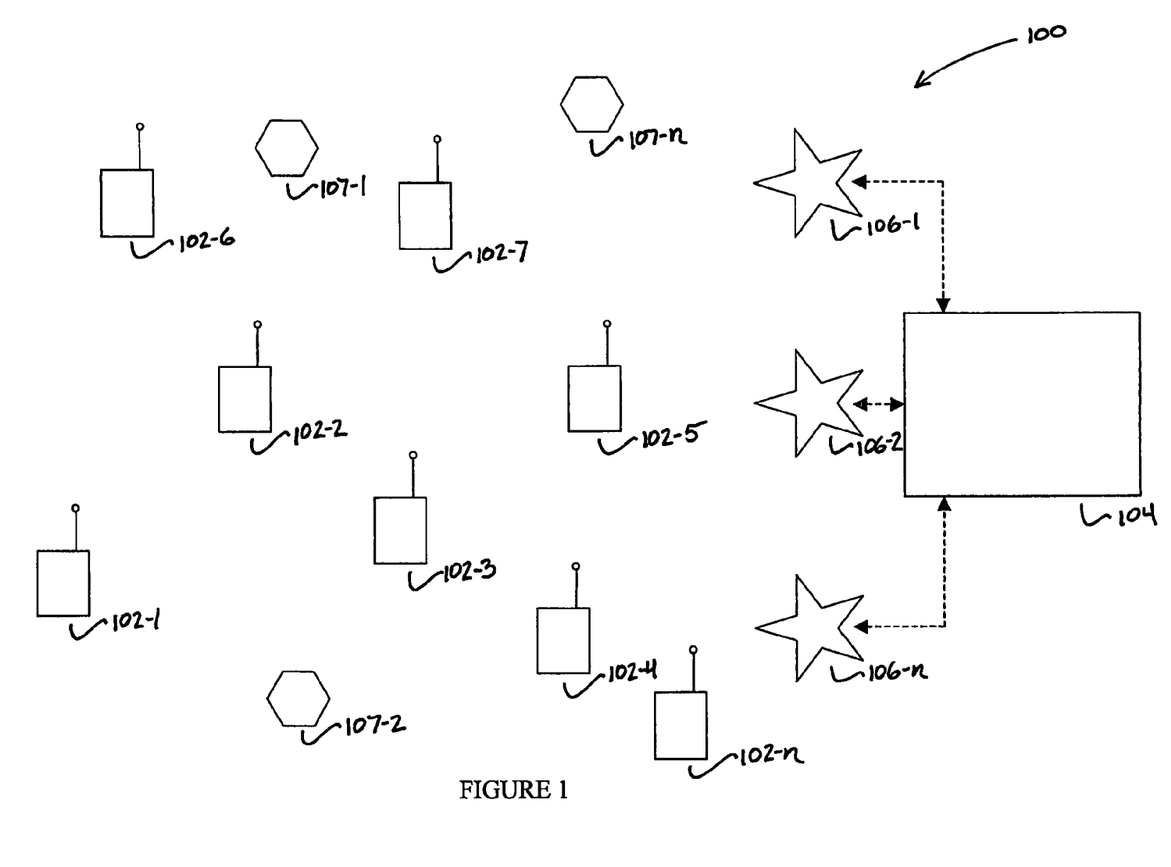
FIG. 1 is a block diagram of an example ad-hoc packet switched wireless communications network including a plurality of nodes in accordance with an embodiment of the present invention.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes 102 or mobile nodes 102), and can, but is not required to, include a fixed network 104 having a plurality of access points 106-1, 106-2, . . . 106-n (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, the public switched telephone network (PSTN) and the Internet. The network 100 may also include a plurality of fixed routers 107-1 through 107-n (referred to generally as nodes 107 or routers 107) for routing data packets between other nodes 102, 106 or 107. It is noted that for purposes of this discussion, the nodes discussed above can be collectively referred to as "nodes 102, 106 and 107", or simply "nodes"

or "terminals". As can be appreciated by one skilled in the art, the nodes 102, 106 and 107 are capable of communicating with each other directly, or via one or more other nodes operating as routers for packets being sent between nodes, as described in U.S. Pat. No. 5,943,322 to Mayor, and in U.S. patent application Ser. Nos. 09/897,790, 09/815,157 and 09/815,164, referenced above.

Figure 2:
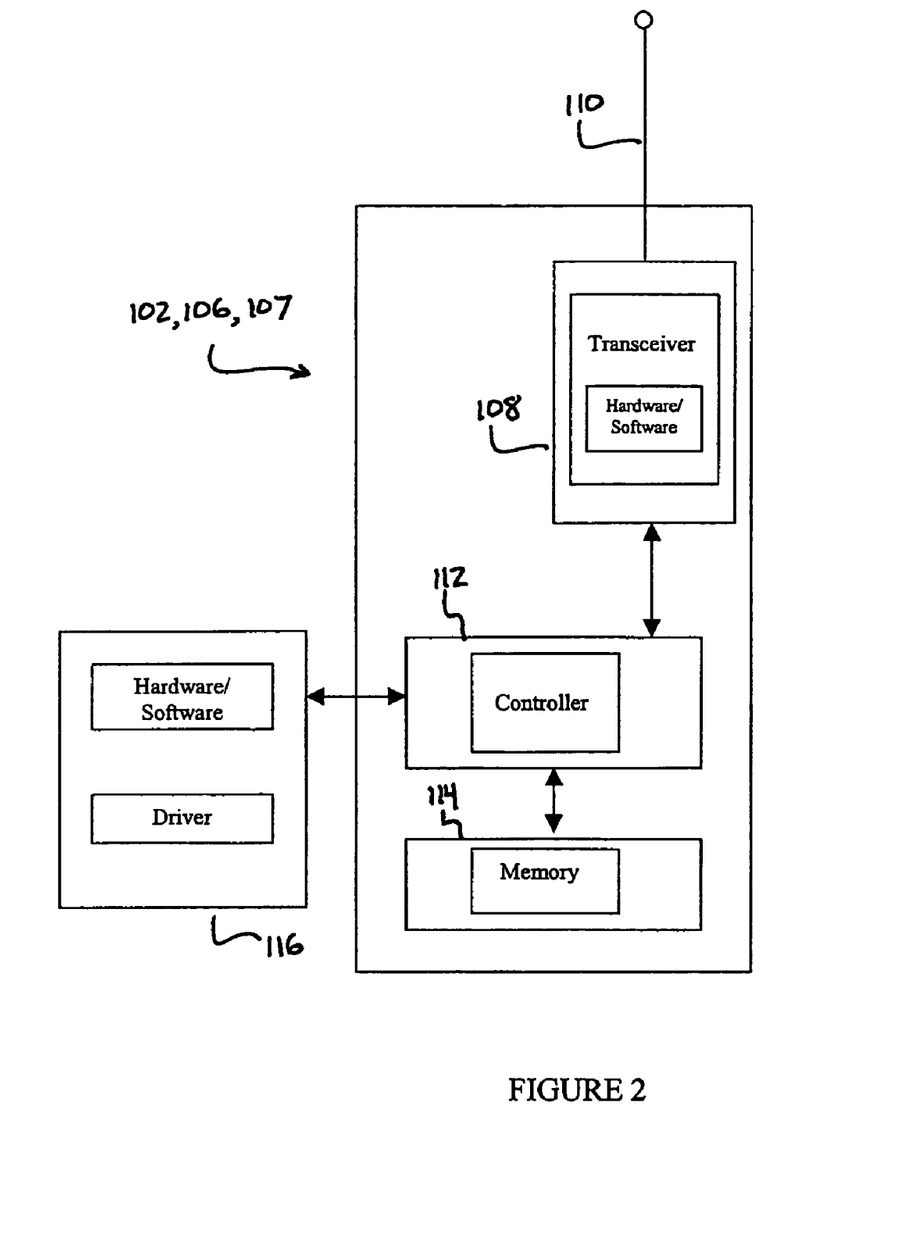
FIG. 2 is a block diagram illustrating an example of a mobile node employed in the network shown in FIG. 1.

As shown in FIG. 2, each node 102, 106 and 107 includes a transceiver 108 which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node routing and update information.

Each node 102, 106 and 107 further includes a memory 114, such as a random access memory (RAM), that is capable of storing, among other things, routing information pertaining to itself and other nodes in the network. The nodes 102, 106 and 107 periodically exchange respective routing information, referred to as routing advertisements, with each other via a broadcasting mechanism at various intervals, such as when a new node enters the network, or when existing nodes in the network move.

As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included. Additionally, each node includes the appropriate hardware and software protocols to perform automatic repeat request (ARQ) functions and media access control (MAC), including a local scheduling algorithm provided to solve fairness and service differentiation problems as set forth in greater detail below.

In the network 100 of FIG. 1, each node 102, 106 and 107, can act as a local scheduler by self-coordinating based on measured quantities in time. This function can be achieved through the use of a "scheduling algorithm", which can be implemented in different ways depending on measured quantities of offered and carried loads, by balancing the tradeoff between performance and complexity. A local scheduling table is kept at every node and is updated by using address and channel monitoring results. Furthermore, each receiving node can control scheduling by using its own table and replying with a tuning factor. An example for tuning factor is given in the example algorithms. The embodiment described below therefore solves numerous problems related to hidden and exposed nodes, and problems related to mobility, by using a two-way scheduling technique that is initiated by the sender and coordinated by the receiver.

In the embodiment of the present invention described below, a single channel may be used as well as multiple channels. The examples are given for multiple-channel systems. In a multi-channel multihop network such as network 100 of FIG. 1, "request-to-send" (RTS) and "clear-to-send" (CTS) messages are transmitted through reservation channels, while data and "acknowledgment" (ACK) messages are transmitted via selected data channels. However in a single channel system, these messages are transmitted over the same channel. The RTS/CTS messages can also include neighbor status information, which can include source and destination MAC addresses, current packet length, data channel rate, selected data channel, weighted queue length computed from the packet priority levels (i.e. a combination of precedence, retransmission attempts, packet age and so forth). On the other hand, the information included in the RTS and CTS messages can be carried in DATA and ACK messages respectively if the system uses a single channel and RTS/CTS is not enabled for the transmission.

In the present embodiment, at least two scheduling schemes can be adopted based upon the information derived from the RTS/CTS messages described above. "Stateless" scheduling can be implemented by using a node's own self priority level only, also known as a node's "weight". "Stateful" scheduling can be implemented by further adjusting according to neighbor nodes' weight values as well. In performing Stateful scheduling, each node can maintain neighborhood (i.e. neighbor node) information from the RTS/CTS control messages sent.

In the embodiments of the present invention described below, a local scheduling algorithm is provided to control channel access times and backoff delays by using at least one of a node's own current status, and a node's neighbor nodes' current status information. Furthermore, the scheduling algorithm provides a service differentiation by adapting these timers according to the priority indices.

The local scheduling algorithm is based upon a two-way distributed, self-coordinating approach to provide fairness and service differentiation in an ad hoc network by using reservation data information. The resulting distributed scheduling in the wireless ad hoc network, including any number of mobile nodes, can be achieved through the following steps in accordance with a first and second embodiment of the present invention.

In a first step, a weighted factor of traffic load and priority is measured at each node. In a second similar step, at each node a weighted factor of traffic load and priority is measured for each neighbor node. These values are used alone, or in combination in a third step to compute at a sending node an access time interval based on the traffic at the sending node, and the sending node's neighbor nodes' traffic conditions. This comprises part one of the two-way scheduling that is initiated by the sender, and coordinated by the receiver as described below in steps four and five.

In a fourth step at a receiving node, an equivalent bandwidth and access time interval for each remote node is computed based on measured traffic obtained from unintended RTS and CTS as described in the examples, followed by a fifth step of determining at the receiving node whether to send CTS or NCTS with adjusted channel access times (i.e. a tuning factor to decrease or increase the channel access attempts) based upon node access according to the computed values. This comprises part two of the two-way scheduling that is initiated by the sender, and coordinated by the receiving node.

The five steps of the two-way scheduling algorithm described above can be applied as either a first or second embodiment in either Stateless or Stateful scheduling algorithm depending upon the scheduling scheme desired. As noted above, two scheduling schemes can be adopted. Stateless scheduling can be implemented by using a node's own weight, and Stateful scheduling can be implemented by further adjusting according to neighbor nodes' weight values as well.

In a first embodiment of the scheduling algorithm, only address and channel monitoring are used for collected information and scheduling the transmission time after the address and/or channel becomes free. In a second embodiment of the scheduling algorithm, each node collects information about the traffic sent by each connection for a certain period of time and updates the weight values in its local table for future scheduling. Since the reservations are done by sending control messages through the reservation channel, every neighbor node tuned to the reservation channel can updates its local table.

The measured quantities of collected information for the first and second embodiment can include various metrics related to a node's or neighbor nodes' offered and carried load, and are described in greater detail below. It can be assumed that in at least one of the embodiments of the present invention, different priorities can correspond to different bandwidth requirements, delay requirements and packet loss rates, and may be defined for each traffic class or flow. In both embodiments, we can differentiate according to different priorities. The main difference is that in the second embodiment, additional neighborhood information distributed via control frames is used to compute the channel access times.

The measured quantities can be derived from RTS and CTS messages, and can include, but are not limited to information about packet length, data channel rate, source MAC address, destination MAC address, channel used (i.e. CTS, RTS, broadcast), packet priority level and weighted queue length. The destination MAC address can indicate the next hop node address, and the packet priority level can be a combined value computed from precedence, backoff counter, age, and so forth, and can be optional and used by the receiving node to preempt the current request. The weighted queue length can be a value weighted according to priority levels and traffic/stream indices to inform queued loads to be transmitted in subsequent times. The classification can be done in terms of traffic classes or flows.

In the first embodiment of the scheduling algorithm, each node that overhears an RTS and CTS message exchange will update its local traffic table by computing channel holdoff time based upon packet length and data channel rate, and address holdoff time based upon source and destination address busy time.

In the second embodiment of the scheduling algorithm, each node that overhears an RTS and CTS message exchange will update its local traffic table by computing channel holdoff time based upon packet length and data channel rate, address holdoff time based upon source and destination address busy time, and weight values.

Based on this information, in both the first and second embodiments each node schedules the next channel access time for use. If an unintended RTS or CTS message is heard, the node computes a release time for the corresponding addresses and channel. This release time depends on the packet duration and a random time interval, which in turn depends on the node weight. The random interval can be, for example, a uniformly distributed time interval minus the normalized node weight, which can be normalized to have positive proportional time intervals. A packet weight may depend on the precedence, number of transmission, age, and so forth. The maximum value of the node weight depends on the individual packet weight values, buffer size and rate limiting algorithms used for each class or flow.

Each node finishing a transmission attempt can schedule a next attempt by setting these channel and destination release times to the values calculated above. The packet will be transmitted if the destination and at least one channel are available. The timers are uniformly distributed with different ranges depending on the node weight, weighted previous packet transmission time and previous transmission status, either failure or success.

In the first scheduling scheme, Stateless scheduling, the node weight is computed as explained for the monitoring case for both the first and second embodiment of the scheduling algorithm. In the second scheduling scheme, Stateful scheduling, when the node tries to schedule its own channel access case for both the first and second embodiment of the scheduling algorithm, it will check its own rank in the local table to compute the channel access timer. Only when its channel access time is due, and no other node grabs the channel, can the node send an RTS message to contend the channel. If there is another transmission attempt during this channel access time, the node will reset the channel access timer, and will schedule a new channel access based on the new information.

For both the first and second embodiment of the scheduling algorithm, if the previous transmission attempt is failed because of an incomplete RTS-CTS handshake, the channel access time will be increased to decrease the possibility of collision. The increment may be exponential. If the previous transmission attempt is failed because of the negative ACK or ACK timeout, the node weight can be increased to compensate the channel impairments.

One function of both scheduling algorithms described above is to decrease the channel access timer when the node's weight is larger and increase the channel access timer in remaining situations. Ideally, the system should be fair to nodes with traffic of the same priority, even with different offered loads. This can be achieved from the computation of maximum and minimum timer values, neighbor node aggregated traffic status and rate limiting algorithms.

For both the first and second embodiment of the scheduling algorithm, when executing the second scheduling scheme, Stateful scheduling, the algorithms can also include a function for tracking the carried load of different nodes.

Specifically, in a first situation when a node receives an RTS message, regardless of whether the RTS message is intended for that node, the algorithm computes address busy time, and offered load based on packet length and data rate, at specified priority levels. If the destination is not a neighbor node, this indicates that the source, but not the destination, is within the communication range of the node. In both cases, the information in the RTS message such as packet length, source, destination, and priority, is useful to measure offered traffic load.

In a second situation, when a node receives a CTS message which is not for that node, the algorithm computes address and channel busy time, and carried load based on packet length and data rate, at specified priority levels.

In a third situation, when a node sends an RTS message, the algorithm computes that nodes' offered load at a specified priority level.

Finally, in a fourth situation, when a node receives a CTS message, the algorithm computes that nodes' carried load at a specified priority level.

If the receiving node detects that the carried load of the receiving node exceeds the allowed value, upon the reception of an RTS requiring transmission the receiving node can decide to send a CTS or a NCTS message to slow down the sending node by carrying a tuning factor. This eliminates many of the problems related to hidden terminals, such as source related unfair channel and destination access, and mobility, such as source related unfair access due to the lack of knowledge about neighborhood when a source moves to a new neighborhood. The sender can adjust its new channel access time by using the receiving node adjustment.

Additionally, both the first and second embodiment of the scheduling algorithm allow nodes in the same neighborhood to schedule the channel access to take service differentiation and fairness into consideration by checking the priority level and weighted queue length. The precedence and weighted queue length can help adjust the channel access delay by giving higher priority to the nodes with high precedence and large weighted queue length, while the packet age factor in the priority level can be used to adjust the channel access delay to avoid the starvation of the nodes with low precedence traffic and light traffic load.

The embodiments of the present invention described above disclose a distributed, self-coordinating approach to provide fairness and service differentiation in an ad hoc network by using control RTS/CTS messages carrying node status information. The local scheduling algorithm described above, uses the overheard RTS/CTS information with attributes specifying nodes status to maximize the awareness of the neighborhood status for a multi-channel system where data and ACK messages are transmitted through different data channels. Both the first and second embodiment of the scheduling algorithm measures the offered load, carried load, and backlogged load in the neighborhood to adjust the channel access timer to provide fairness among different nodes, different links, and different streams. Each algorithm can also calculate both the priority level based on the node queue status, and the priority level based on the neighbor status, to break the contention tiers and enable the service differentiation, and use the receiving node to coordinate the distributed scheduling decision based on the receiving node's better view about the neighborhood to avoid starving nodes with low traffic load.

The following is an illustrative description of an embodiment of the present invention with examples. The following examples illustrate the first and second algorithms where the node (source or relaying node) has a set of traffic classes (c). In these examples, the fairness interval is computed after each transmission attempt while channel and address monitoring are done upon a reception of unintended RTS or CTS (i.e. RTS or CTS not intended for this node). The examples cover transmission of a unicast message. Note that the computation of backoff values, priority levels and measurements may be changed, and the examples are given for clarification.

First Algorithm

Transmission of a packet:

1) An aggregated "weight" is computed as the summation of the priority values of the packets in the Packet Store. The priority of a packet may be computed as the weighted summation of the precedence, number of attempts and age of the packets.

$$W_j = \sum_i p_i$$

$p_i = wp_c pr_i + wn_c na_i + wa_c a_i$ where $W_j$ is the aggregated weight for node j, $p_i$ is the priority level of $i^{th}$ packet, $wp_c$, $wn_c$, and $wa_c$ are the weight factors for precedence ($pr_i$), number of attempts ($na_i$) and age ($a_i$) of the packet that is in the queue assigned for the class c, respectively. Note that the weight corresponds to the offered load. Although the relationships between a node's weight and priority information are linear in the given example, other type of relationships can be used, such as exponential or logarithmic. Similarly, various modifications and variations of the present invention such as the fairness interval computations may be made in light of these examples.

2) If the node is ready to transmit a packet with fresh route to the destination and idle next hop then transmit the RTS including the set of available data channels, transmission duration, source and next hop addresses. Note that since this is a multihop system, a fresh route should be available before transmission. Any change in the route may change the packet to be transmitted.

3) If CTS is timeout or NCTS is received, update the fairness interval Tf.

$$Tf = wf(U[Rf] + Mf - Wn_j)$$

where wf is a positive number (if exponential backoff is used, wf is increased by 2 at every CTS reception failure), Rf and Mf are positive numbers, U[ ] denotes uniform distribution. $Wn_j$ is the normalized weight so that $Mf - Wn_j \geq n$ where n is a positive number. For example for n=0; $Wn_j = (W_j Mf)/W_{max}$ where $W_{max}$ is the maximum weight value.

4) If CTS is received, decrease wf or set wf=1. CTS includes the selected data channel, transmission duration, source and next hop addresses. Check if the receiver sent a new $w_f$ value for this node. Note that the tuning factor may include other parameters used in the backoff formulas.

5) If ACK is received, update the fairness interval.

$$Tf = wf(U[Rf] + Mf - Wn_j + wt\ pk\_time)$$

where wt is the weight factor for packet transmission duration pk_time. Note that if one wants to provide fairness in sharing the relaying nodes, a fairness interval for the use of a next hop may be computed similar to channel fairness interval.

Address and channel monitoring:

1) Upon reception of an unintended RTS, wait for the CTS and mark both source and next hop addresses busy for a time interval Ta.

$$Ta = pk\_time + wf(U[Rf] + Mf - Wn_j)$$

where pk_time is the duration of the transmission including the corresponding overhead due to the handshake technique. Rf and Mf may be different for fairness computation and monitoring.

2) Upon reception of an unintended CTS, mark both source and next hop addresses and the channel busy for a time interval Ta.

$$Ta = pk\_time + wf(U[Rf] + Mf - Wn_j)$$

where Rf and Mf may be different for address and channel monitoring.

Second Algorithm

Transmission of a packet:

1) An aggregated "weight" is computed as the summation of the priority values of the packets in the Packet Store. The priority of a packet may be computed as the weighted summation of the precedence, number of attempts and age of the packets. Note that every node distributes its weight value via RTS and CTS messages.

$$W_j = \sum_i p_i$$

$$p_i = wp_c pr_i + wn_c na_i + wa_c a_i$$

$$Wt_j = \frac{W_j}{\sum_k W_k}$$

where $W_j$ is the aggregated weight for node j, $p_i$ is the priority level of ith packet, $wp_c$, $wn_c$, and $wa_c$ are the weight factors for precedence ($pr_i$), number of attempts ($na_i$) and age ($a_i$) of the packet that is in queue c, respectively and $Wt_j$ is the node weight normalized according to the neighbor nodes' weight.

2) If the node is ready to transmit a packet with fresh route, idle next hop then transmit the RTS including the set of available data channels, transmission duration, source and next hop addresses, the node weight and channel access/throughput information.

3) If CTS is timeout or NCTS is received, update the fairness interval Tf.

$$Tf = wf(U[Rf] + Mf - Wtn_j)$$

where wf is a positive number (if exponential backoff is used, wf is increased by 2 at every CTS reception failure), Rf and Mf are positive numbers, U[ ] denotes uniform distribution. $Wtn_j$ is the normalized weight so that $Mf - Wtn_j \geq n$ where n is a positive number. Note that, the ranges for the parameters should be different than those of the first algorithm. Same symbols are used for simplification.

4) If CTS is received, decrease wf or set wf=1. Check if the receiver sent a new $w_f$ value for this node. Note that the tuning factor may include other parameters used in the backoff formulas.

5) If ACK is received, update the fairness interval.

$$Tf = wf(U[Rf] + Mf - Wtn_j + wt \, pk\_time)$$

where wt is the weight factor for packet transmission duration pk_time.

6) After the reception of ACK, update the node channel occupancy time. Other parameters such as throughput can also be used.

$$CT_j(t) = (1-\alpha)\Sigma\alpha^l pk\_time(t-l)$$

where $\alpha$ is the forgetting factor and l is the last time $CT_j$ was updated. Note that $\alpha$ may be dependent on the mobility, e.g. may be selected according to the changing rate of the neighbor table. Note that if one wants to provide fairness in sharing the relaying nodes, a fairness interval for the use of a next hop may be computed similar to channel fairness interval.

Address and channel monitoring:

1) Upon reception of unintended an RTS, wait for the CTS and mark both source and next hop addresses busy for a time interval Ta.

$$Ta = pk\_time + wf(U[Rf] + Mf - Wtn_j)$$

where pk_time is the duration of the transmission including the corresponding overhead due to the handshake technique. Rf and Mf may be different for fairness computation and monitoring. Update $W_k$ and $CT_k$ values for this node. Compare the $CT_k$ and $W_k$ values with $CT_j$ and $W_j$ values to update $w_f$ values. Note that the weight corresponds to offered load while channel occupancy information corresponds to carried load.

2) Upon reception of an unintended CTS, mark both source and next hop addresses and the channel busy for a time interval Ta. Update $W_k$ and $CT_k$ values for this node if not updated for RTS.

$$aTa = pk\_time + wf(U[Rf] + Mf - Wtn_j)$$

where Rf and Mf may be different for address and channel monitoring. Compare the $CT_k$ and $W_k$ values with $CT_j$ and $W_j$ values to update $w_f$ values.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A method for performing media access control (MAC) scheduling for nodes in an ad-hoc multi-hopping peer-to-peer wireless communication network, the method comprising:

controlling a node attempting a transmission to assess its priority level weight in relation to other nodes in the network based on information included in received request to send (RTS) and clear to send (CTS) messages including those exchanged by the other nodes in the network; and scheduling the transmission of the node based on the assessed priority level weight.

2. A method as claimed in claim 1, wherein:

the controlling step further includes assessing priority level weights of neighboring nodes based on received RTS and CTS messages; and the scheduling step schedules the transmission based on the assess priority level weight of the node and the assessed priority level weights of the neighboring nodes.

3. A method as claimed in claim 1, wherein:

the information included in the RTS and CTS messages comprises at least one of the following: source and destination MAC addresses, current packet length, data channel rate, selected data channel, tuning factor and weighted queue length computed from the packet priority levels.

4. A method as claimed in claim 1, wherein:

the information included in the RTS and CTS messages can be carried in DATA and ACK messages respectively if the system uses a single channel and RTS/CTS is not enabled for the transmission.

5. A method as claimed in claim 1, wherein: the node is a mobile node.

6. A method as claimed in claim 1, wherein:

the priority level weight is based on an aggregation of weight factors pertaining to the packets in a queue of the node awaiting transmission by the node.

7. A method as claimed in claim 1, wherein:
the priority level weight is based on information pertaining to at least one other priority level weight of at least one other node.

8. A method for performing media access control (MAC) scheduling for nodes in an ad-hoc multi-hopping peer-to-peer wireless communication network, the method comprising:
controlling a node attempting a transmission to assess its priority level weight, in relation to other nodes in the network, which is based on an aggregation of weight factors pertaining to the packets in a queue of the node awaiting transmission by the node; and
scheduling the transmission of the node based on the assessed priority level weight.

9. A method as claimed in claim 8, wherein:
the priority level weight is based on information pertaining to at least one other priority level weight of at least one other node.

10. A node, adapted to perform media access control (MAC) scheduling for transmission in an ad-hoc multi-hopping peer-to-peer wireless communication network, the node comprising:
a controller, adapted to assess a priority level weight of the node attempting a transmission, the priority level weight being in relation to other nodes in the network, and being based on at least one of the following: an aggregation of weight factors pertaining to the packets in a queue of the node awaiting transmission by the node, information pertaining to at least one other priority level weight of at least one other node and information included in received request to send (RTS) and clear to send (CTS) messages including those exchanged by the other nodes in the network; and
the controller is further adapted to schedule the transmission by the node based on the assessed priority level weight.

11. A node as claimed in claim 10, wherein:
the controller is further adapted to assess the priority level weights of neighboring nodes based on received RTS and CTS messages; and
the controller is adapted to schedule the transmission based on the assess priority level weight of the node as adjusted based on the assessed priority level weights of the neighboring nodes.

12. A node as claimed in claim 10, wherein:
the information included in the RTS and CTS messages comprises at least one of the following: source and destination MAC addresses, current packet length, data channel rate, selected data channel, tuning factor and weighted queue length computed from the packet priority levels.

13. A node as claimed in claim 10, wherein:
the information included in the RTS and CTS messages can be carried in DATA and ACK messages respectively if the system uses a single channel and RTS/CTS is not enabled for the transmission.

14. A node as claimed in claim 10, wherein:
the node is a mobile node.

15. A method as claimed in claim 1, wherein:
the scheduling further includes scheduling the transmission based on a fairness interval relating to timing of use of another node by the node as a next hop for the transmission.

16. A method as claimed in claim 15, further comprising:
operating a receiving node to include a tuning factor in the CTS message to the transmitting node in response to the RTS message from the node attempting transmission such that the node attempting transmission assesses its fairness interval based on the tuning factor.

17. A method as claimed in claim 8, wherein:
the scheduling further includes scheduling the transmission based on a fairness interval relating to timing of use of another node by the node as a next hop for the transmission.

18. A method as claimed in claim 17, wherein:
the fairness interval is further based on a tuning factor included in a CTS message that a receiving node to which the node is attempting transmission sends to and is received by the node.

19. A node as claimed in claim 10, wherein:
the controller is further adapted to schedule the transmission based on a fairness interval relating to timing of use of another node by the node as a next hop for the transmission.

20. A node as claimed in claim 19, wherein:
the fairness interval is further based on a tuning factor included in the CTS message that a receiving node to which the node is attempting transmission sends to and is received by the node.

* * * * *